Oct. 11, 1932.   C. W. KANOLT   1,882,648
PRODUCTION OF STEREOSCOPIC PICTURES
Filed June 18, 1930   6 Sheets-Sheet 1
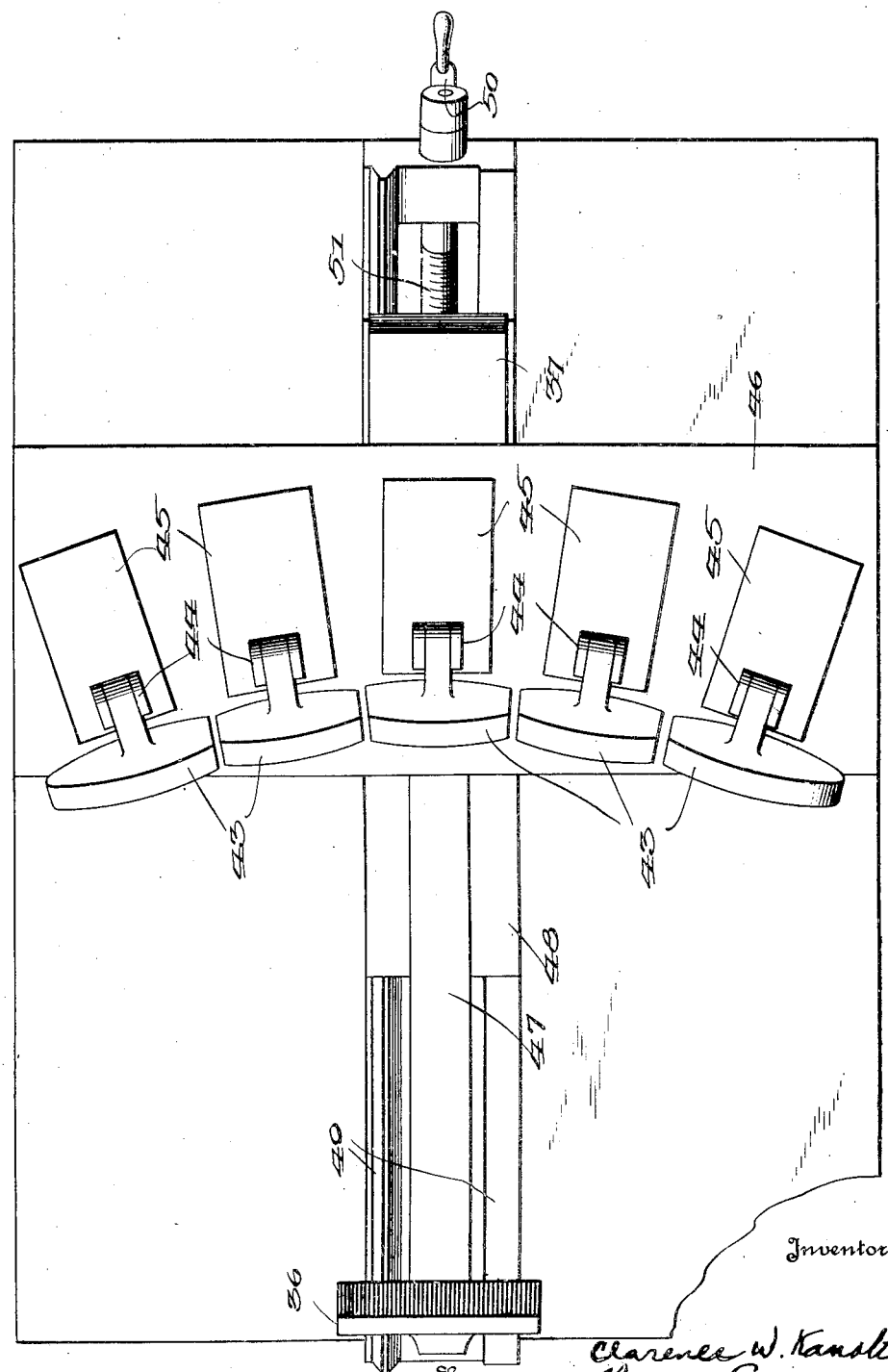
Inventor
Clarence W. Kanolt
Norman E. Hodges
   his Attorney Oct. 11, 1932.　　　　C. W. KANOLT　　　　1,882,648
PRODUCTION OF STEREOSCOPIC PICTURES
Filed June 18, 1930　　　　6 Sheets-Sheet 2
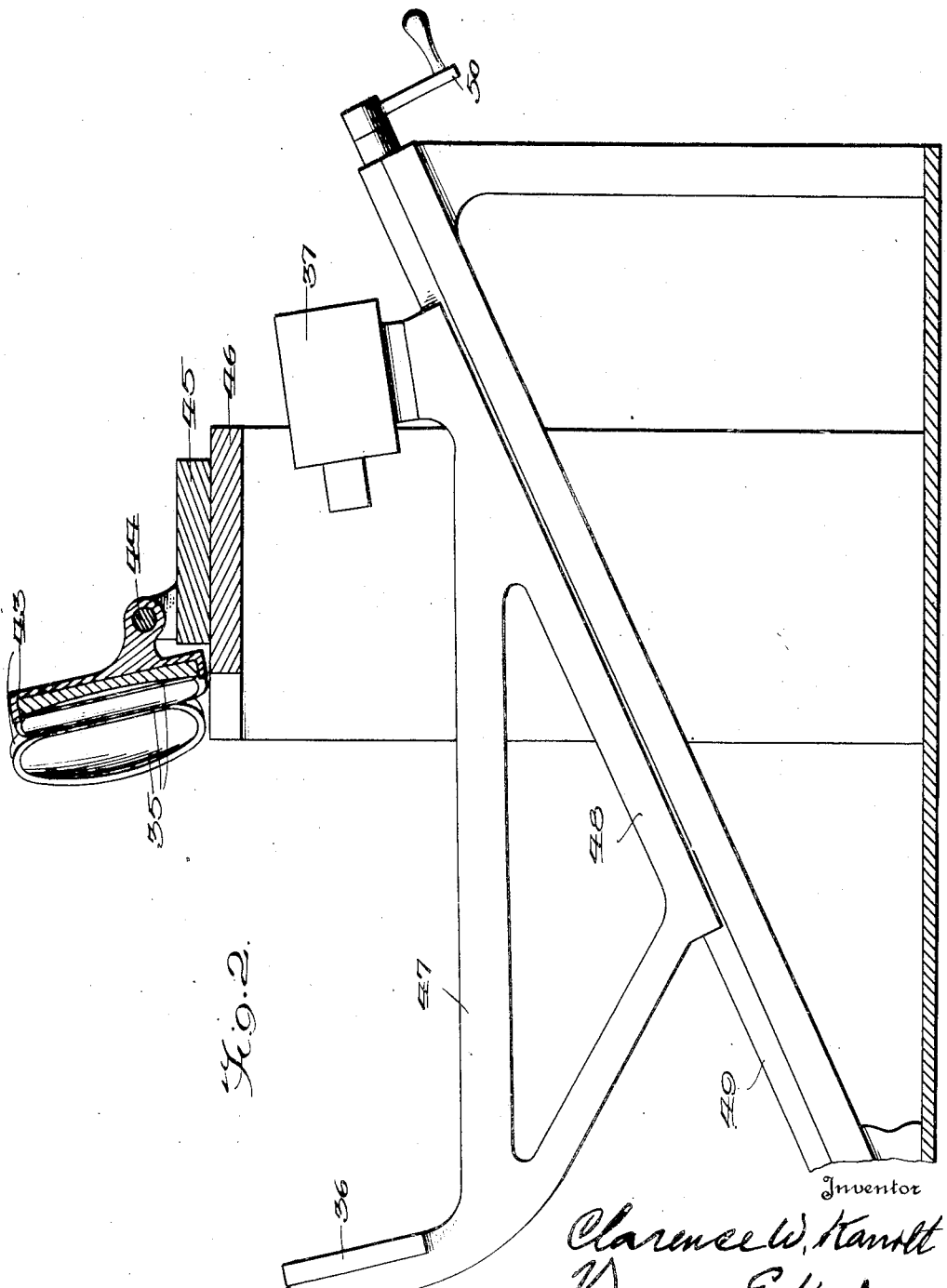

Oct. 11, 1932.　　　C. W. KANOLT　　　1,882,648
PRODUCTION OF STEREOSCOPIC PICTURES
Filed June 18, 1930　　　6 Sheets-Sheet 3
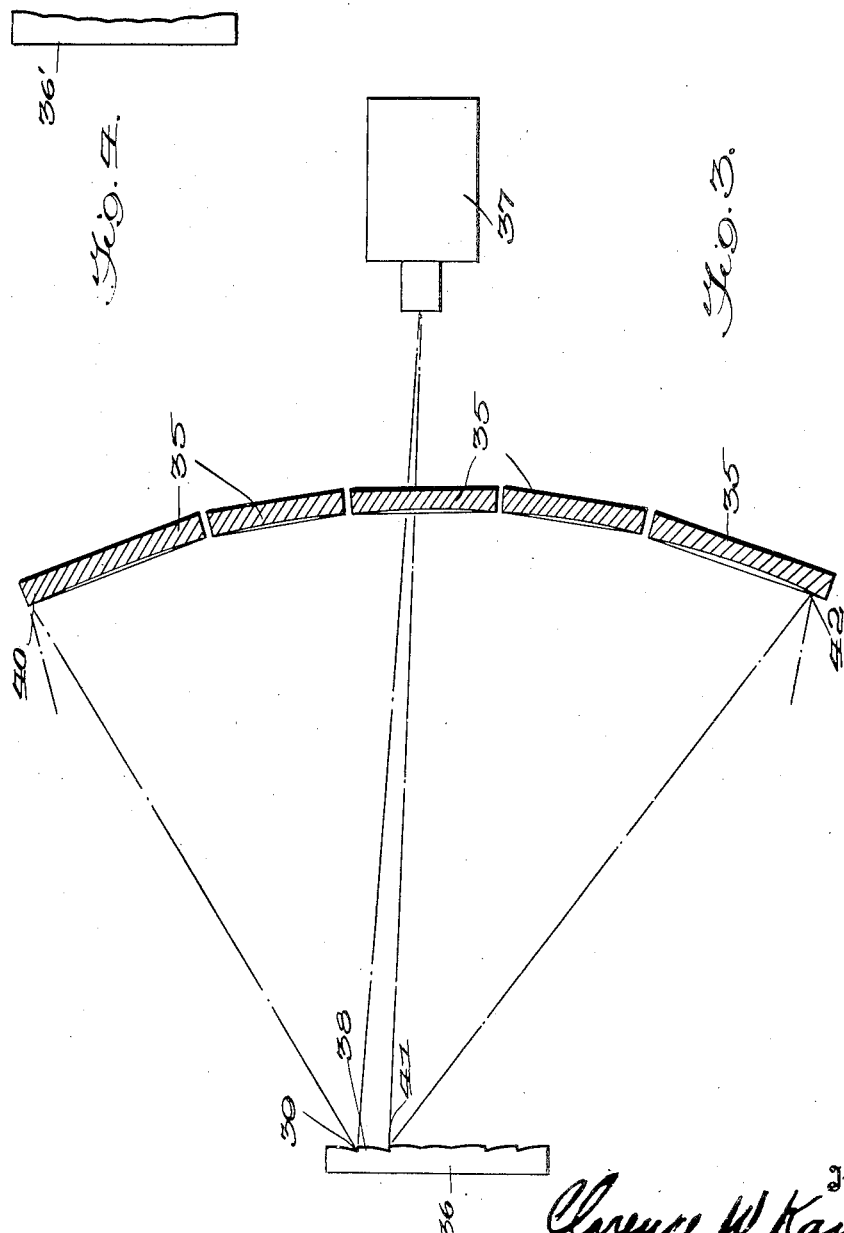

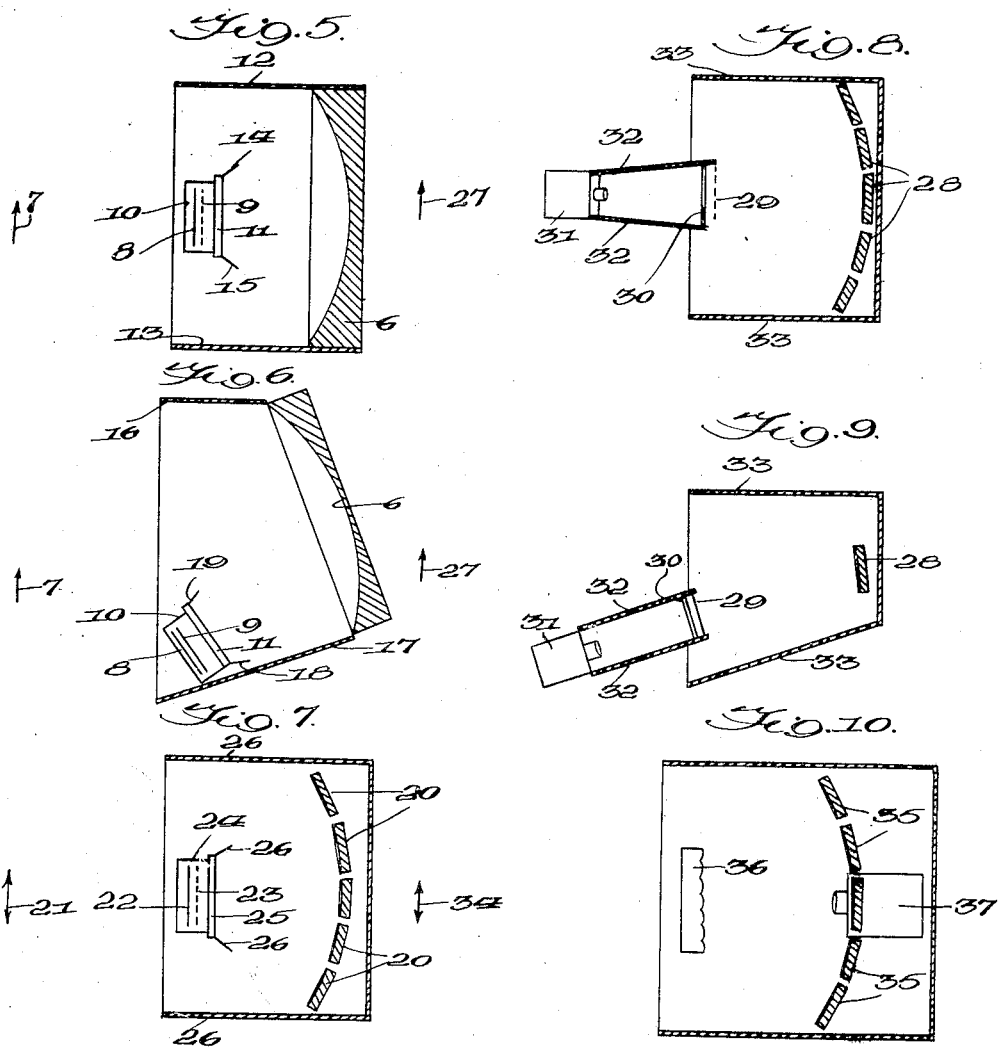

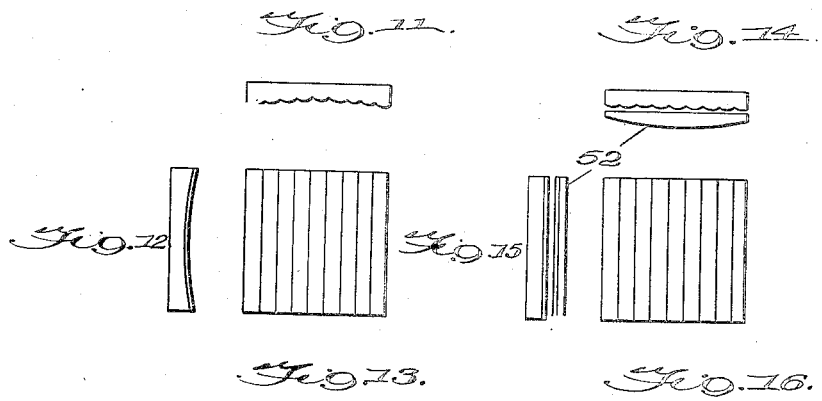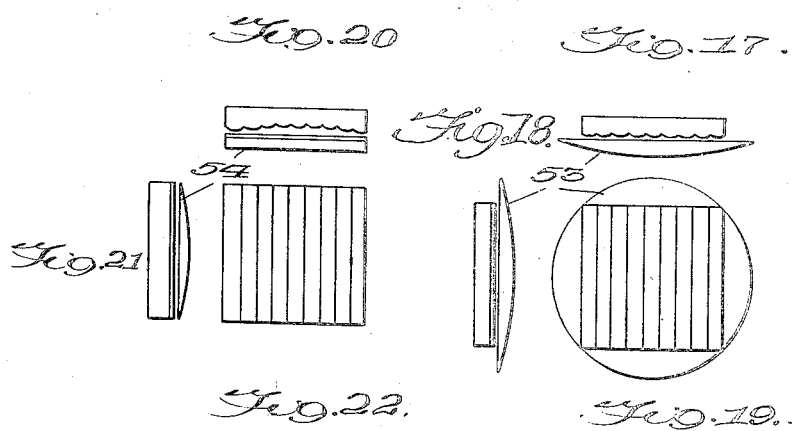

Oct. 11, 1932.  C. W. KANOLT  1,882,648
PRODUCTION OF STEREOSCOPIC PICTURES
Filed June 18, 1930   6 Sheets-Sheet 6
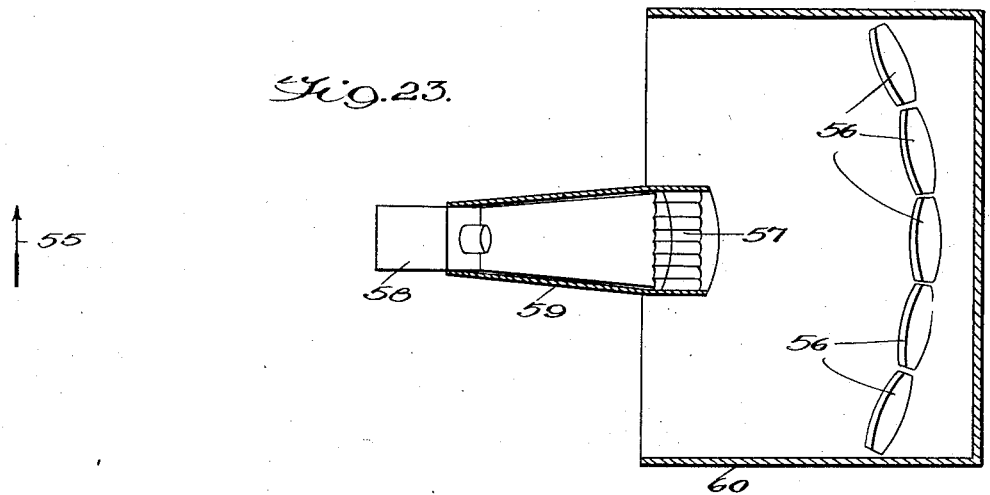
Fig. 23.
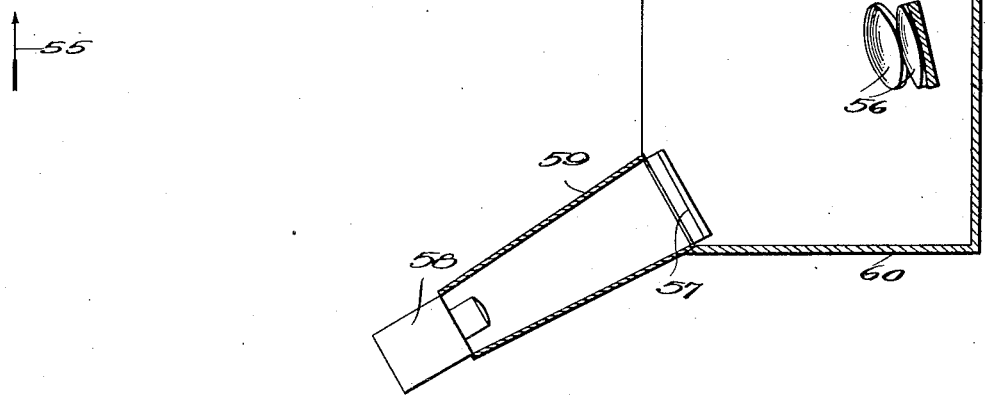
Fig. 24.
Fig. 25. Fig. 26. Fig. 27.
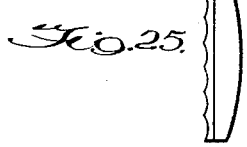
Inventor
Clarence W. Kanolt
By Vernon E. Hodges
his Attorney Patented Oct. 11, 1932

1,882,648

UNITED STATES PATENT OFFICE

CLARENCE W. KANOLT, OF NEW YORK, N. Y.

PRODUCTION OF STEREOSCOPIC PICTURES

Application filed June 18, 1930. Serial No. 462,006.

This invention relates to the production of stereoscopic pictures, and either still or motion pictures may be made with the device.

The object of the invention is to improve the methods and photographic apparatus for this purpose. It may be utilized in photographing larger objects than some methods heretofore suggested as in French patent to Bessiere No. 590,853, of February 20, 1924. It has a further advantage of involving no moving parts other than those of the ordinary still or motion picture camera, and it requires only a short exposure.

In the accompanying drawings:

Fig. 1 shows a top plan view of my preferred apparatus;

Fig. 2 is a vertical sectional view therethrough;

Fig. 3 is an optical diagram of the ribbed mirror and concave mirrors used;

Fig. 4 is a view showing a slightly modified form of ribbed mirror;

Fig. 5 is a diagrammatic horizontal section of a slightly modified arrangement;

Fig. 6 is a similar view in vertical section;

Fig. 7 is a view similar to Fig. 5 showing a series of mirrors;

Fig. 8 is a similar view in horizontal section showing a further modification;

Fig. 9 is a vertical section of the same;

Fig. 10 is a horizontal section showing the use of a ribbed mirror and applicable to either still or motion pictures;

Fig. 11 is a plan view of one form of ribbed mirror;

Fig. 12 is an edge view thereof;

Fig. 13 is a front elevation thereof;

Figs. 14, 15 and 16 are views similar to Figs. 11, 12 and 13 and showing a slightly different form of mirror;

Figs. 17, 18 and 19 are similar views of another form of ribbed mirror;

Figs. 20, 21 and 22 are similar views of still another form of ribbed mirror;

Fig. 23 is a horizontal sectional view showing the application of the invention to the use of a grooved lens;

Fig. 24 is a vertical sectional view therethrough, and

Figs. 25, 26 and 27 are views of alternative forms of grooved lenses.

In all of the figures, the relative size of the grooves is exaggerated for the sake of clearness.

In the device set forth in the French patent to Bessiere, No. 590,853, February 20, 1924, the body of the camera was provided with a large lens, a photographic plate and a lined screen carrying alternately opaque and transparent lines spaced from the photographic plate.

In order to make good stereoscopic pictures of large objects with Bessiere's device, a very large lens would be desirable, and the lens of the camera must be at a considerable distance therefrom, both of which conditions are undesirable. There is a limit to the size in which a lens can be made, and large lenses are expensive. Mirrors of good optical quality may be obtained in larger sizes than lenses.

In Figs. 5 and 6, I have illustrated the use of a concave mirror 6. In this figure, 7 is the object to be photographed; the photographic plate is at 8 and the lined screen at 9. The photographic plate 8 and lined screen 9 are enclosed in a box 10.

The positions of the parts are so adjusted that an image of the object 7 is focused upon the lined screen 9. At 11, is a shutter of ordinary construction for exposing the plate for the required length of time. At 12, 13, 14, 15, 16, 17, 18 and 19 are opaque screens for preventing stray light from reaching the photographic plate.

To prevent the box 10 from obstructing the light rays passing from the object 7 to the mirror 6, the mirror is tilted downward and the camera box 10 is placed in a position to receive the image, below the rays passing from the object to the mirror, as shown in Fig. 6. The same result could be obtained by turning the mirror sideways or upward and placing the camera box in the corresponding position. This applies also to other forms of the device shown in Figs. 1, 2, 7, 8, 9, 10, 23 and 24.

There is also a limit to the size in which mirrors are obtainable. In order to further increase the width of the light-gathering optical system, I propose to employ a group of concave mirrors as shown in Fig. 7. This device is similar to that shown in Figs. 5 and 6 except that the single mirror 6 of the latter figures is replaced by a horizontal row of mirrors 20. The number of mirrors may vary as desired.

The object photographed is at 21, photographic plate at 22, lined screen at 23, camera box at 24, shutter at 25. Screens 26 for keeping stray light from the plate are also shown, as before.

If the concave mirrors have spherical surfaces, they may be so arranged that their surfaces form part of a single spherical surface, as though they were parts of a single mirror. The surface that gives a perfectly correct focusing of light from a source at one point upon another point is not a spherical surface but the surface of an ellipsoid of which the two points are the foci. The optical properties of the assemblage of mirrors 20, can therefore be improved slightly by arranging them not in an arc of a circle, but in an arc of a suitable ellipse.

A lens or mirror of large diameter such as is required, is usually of somewhat inferior optical qualities, as compared with one of smaller diameter with the same focal length, because light rays from near the margin of the mirror or lens are not usually brought to a focus at exactly the same point as rays from the center. But in the devices herein described, the rays from different parts of the lens or mirror in a horizontal direction are separated by the lined screen to form images in slightly different parts of the photographic plate. Hence, a series of mirrors of considerable length horizontally, as in Fig. 7, can be used without great impairment of the optical results.

In the forms of the device that have been described up to this point, the image formed on the lined screen will usually be a large one because the large size of the mirror or system of mirrors employed requires that it should have a rather long focal length. Figs. 8 and 9 illustrate a device by which an image can be formed on a photographic plate or film of relatively small size. In these figures the object photographed is at 27. At 28 are mirrors like those of Fig. 7. At 29 is a lined screen. At 30 is a plate of translucent material such as ground glass. This glass 30 is so located as to receive an image like that received by the photographic plate as in Figs. 5, 6 and 7. This image is photographed in any size desired by means of the camera 31. At 32 and 33 are opaque screens to keep out stray light.

The forms of the device that have been described up to this point are suitable for making stereoscopic still pictures, but can not be applied readily, directly to the making of stereoscopic motion pictures, for two reasons: one is that in all but the device last described the image formed will usually be much too large to be received by an ordinary motion picture film; and the other reason is that in pictures made by all these devices when viewed in the manner in which motion pictures must be viewed, the stereosopic effect would be reversed.

In Fig. 10 is shown a device in which both the difficulties mentioned are overcome. The object photographed is shown at 34, and the horizontal row of concave mirrors at 35. At 36 in the focus of these mirrors, is a mirror the surface of which is ridged vertically with approximately parallel straight ridges. At 37 is a camera arranged to photograph the image formed on the mirror 36. The camera may be either a motion picture camera or one used for making still pictures. It is placed below (or above) the level of the concave mirrors.

Figs. 1 and 2 show this apparatus in greater detail, and Fig. 3 shows the optical properties of the ribbed mirror 36.

The surface of the mirror 36 is divided with vertical strips and the surface of each of these strips is convex. These strips should be made quite narrow. In the drawings they are shown relatively wide for the sake of clearness.

Referring to Fig. 3, each particular ridge, for example 38, is of such form that near one boundary 39 it reflects to the camera 37 light from near one end 40 of the assemblage of concave mirrors 35, and near the other boundary 41 it reflects to the camera light from near the other end 42 of the assemblage of concave mirrors, and at intermediate parts of the ridge 38 it reflects to the camera light from intermediate sections of the concave mirrors 35. In Fig. 3 the dotted lines represent the paths of light rays.

The ribbed mirror 36 presents to the camera 37 an inverted image of the objects to be photographed. This image would appear in general quite blurred because it presents a combination of views of the objects as seen from the quite different positions of the different parts of the assemblage of concave mirrors. However, if only the parts of the strips that reflect light from a single part of the assemblage of concave mirrors are observed as for example only the light from near the right-hand boundaries of the strips, which parts all reflect light from near the right-hand end of the assemblage of concave mirrors, then there would be a relatively clear image presenting the aspects of the objects from a single point of view.

If the image on the ribbed mirror is photographed and a positive photograph is printed from the negative so obtained, then when this is viewed through a suitable lined screen slightly spaced in front of it, it presents a stereoscopic picture.

The ribs of the ribbed mirror will give approximately the correct results if the cross section of each is approximately an arc of a circle of such radius that one boundary of the rib reflects one end of the concave mirror system and the other boundary reflects the other end.

To give the desired results the surfaces of the ribs near the sides of the mirror should be inclined inwardly somewhat, as is shown in the mirror 36 in Fig. 3. If the ribs are placed so as to be all tangent to the same plane, as they are represented in Fig. 3, there will then be only very slight jogs or steps between the surfaces of adjoining ribs. These jogs can be avoided by the arrangement shown in Fig. 4 which presents a similar edge view of a mirror 36' in which the ridges have been displaced in a direction perpendicular to the surface of the mirror to such an extent as to eliminate the jogs between the ridges. This renders the surface as a whole slightly concave.

If the surface strips on the mirror 36 were concave instead of convex, each individual strip in the image produced would be reversed from left to right. This would give a picture which would present a reversed stereoscopic effect when viewed by transmitted light with a screen in front of it, but would appear correctly stereoscopic when viewed with the lined screen behind it.

Figs. 1 and 2 show the device illustrated diagrammatically in Figs. 10 and 3 more in detail. The concave mirrors 35 are supported in cases 43, which are adjustably attached by hinges 44 to adjustable blocks 45 carried on a support 46. I do not limit myself to the particular means of support and adjustment shown here, which may be varied as is desired.

It is desirable to avoid changing the distance of the camera 37 from the ribbed mirror 36, and to avoid changing the focusing of the camera, in order that in the image formed on the photographic film or plate the strips in the picture may always have the same spacing. For this reason the ribbed mirror 36 and the camera 37 are rigidly connected to a frame 47.

If the camera 37 were turned directly toward the mirror 36, the strips in the image formed in the camera would not be quite parallel, like those in the mirror, because the mirror 36 must be slightly inclined toward the direction of the camera in order to reflect light from the concave mirrors 35 into the camera. This difficulty is avoided by tilting the camera to the same extent that the ribbed mirror 36 is tilted, as shown in Fig. 2, with, if necessary, a slight vertical adjustment of the position of the camera lens.

In order to focus the apparatus so as to form at the mirror 36 an image of the objects to be photographed, the frame 47 carrying the mirror 36 and the camera 37 is bodily movable. The frame 47 is mounted on a carriage 48 which is movable along ways 49 which may be adjusted in position by means of a handle 50 which turns a screw 51 which engages the carriage 48.

If motion pictures are produced by the apparatus they should be projected onto a translucent motion picture screen from the rear and viewed through a lined screen or other suitable viewing screen. This method of projecting and viewing stereoscopic motion pictures has been described by Bessiere, French patent No. 590,853, (Fig. 8).

Suitable screens to keep out stray light should be provided as shown in Fig. 10.

I have described the production of images on the ribbed mirror 36 by means of an assemblage of concave mirrors. The image might be formed, however, by a single concave mirror, by a single lens or by an assemblage of lens, in short, by any light-focusing or image-forming means.

In the ribbed mirror above-described, the surface of the mirror as a whole is made slightly concave as shown in Fig. 4, or else the individual ridges are made with their faces inclined the same as in Fig. 4 but are set as in Fig. 3, so that the surface of the mirror as a whole is plane.

This curvature of the mirror (or an arrangement equivalent optically to curvature as in Fig. 3) is around a vertical axis only; that is, the surface of the mirror as a whole is a section of a cylinder having a vertical axis.

I may use a ribbed mirror that is curved in both directions instead of one, and like the others is concave. Its surface as a whole would then have approximately the form of a section of the surface of a sphere. Such a mirror is shown in Figs. 11 to 13.

The advantage of having curvature about a horizontal axis as well as about a vertical one is that the ribbed mirror then receives the light that it transmits to the camera from a vertically narrower region of the horizontal row of concave mirrors. This permits this row being made up of mirrors of smaller height than could otherwise be used.

In Figs. 14 to 22 ribbed mirrors are shown combined in various ways with lenses placed adjacent to them. In Figs. 14 to 19 the surface of the mirror as a whole is flat. In Figs. 20 to 22, it is curved in one direction only. The advantage of these three forms over that of Figs. 11 to 13 is that the ribbed mirrors are likely to be easier to make than that of Figs. 11 to 13. In each case in which a lens is used the lens is a plano-convex or a double convex lens, i. e. a converging lens, and the light passes through the lens twice in its course from the horizontal row of mirrors to the camera.

In each of the Figures 16, 19 and 22, the ribs of the mirror are seen through the lens in front elevation. In Figs. 14 to 16 the lens 52 is a cylindrical one with its axis vertical. This combination of lens and mirror is approximately equivalent optically to the kind of mirror above-described in connection with Figs. 3 and 4.

The combinations of lens and mirror of Figs. 17 to 22 are approximately equivalent optically to the mirror shown in Figs. 11 to 13 and have the advantage of that form. In Figs. 17 to 19 the lens 53 has its surface curved in both directions like an ordinary convex lens. In Figs. 20 to 22, the surface of the mirror is curved in one direction and that of the cylindrical lens 54 is curved in the other direction.

In the modification shown in Figs. 23 to 27, the ribbed mirror is replaced by a grooved lens.

At 55 is the object to be photographed. Concave mirrors 56 are employed as shown in Figs. 1 to 3. At 57 is a grooved lens which performs the functions of the ribbed mirror 36. The lens 57 is so located that the concave mirrors 56 form upon it an image of the object 55. At 58 is a camera, either a still camera or a motion-picture camera, arranged to photograph the image formed on the ribbed lens 57. At 59 and 60 are screens to keep out stray light.

In the form of the grooved lens 57 shown in Figs. 23 and 24, one surface of the lens has the form of a convex cylindrical surface with its axis vertical. The other surface carries a number of approximately straight, concave, vertical grooves. This grooved lens is approximately equivalent optically to the ribbed mirror 36, save that the image is to be photographed through the lens. Owing to this latter circumstance, the image obtained by the camera is reversed from left to right relative to that obtained by the ribbed mirror device. When a positive is made from the negative, or when a positive is projected upon a screen, this reversal can be corrected in any of several well-known ways.

If the strips of surface on the grooved lens were convex instead of concave, the effect would be like that produced by making the strips of surface on the ribbed mirror concave instead of convex, as above described.

Figs. 25, 26 and 27 present alternative forms of ribbed lenses. The lens of Fig. 25 is like that of Figs. 23 and 24, except that it is made of two pieces which may be of different materials, such as glass and celluloid. This may facilitate its construction.

In Fig. 26 the grooves are formed upon a curved surface of the lens instead of a flat surface as in Fig. 27.

Any of these forms may be turned about so as to present the opposite face toward the camera. Thus, Fig. 27 presents a lens identical with that of Figs. 23 and 24 but in a reversed position.

Figs. 23 to 27 show lenses which are curved in one direction only, namely, about a horizontal axis; that is, the general form of the lens aside from the grooves is that of a cylindrical lens with its axis vertical. They are thus all approximately equivalent to the ribbed mirrors above-described, which were curved in one direction only. The lenses may have, however, spherical surfaces instead of cylindrical surfaces. They would then correspond in properties to a mirror curved in both directions such as that of Fig. 11, and they would have the advantage possessed by such a mirror of permitting the use of a row of concave mirrors of smaller height.

The focusing of the device of Figs. 23 and 24 could be accomplished best by moving as a unit the assemblage consisting of the camera 58, the grooved lens 57 and the screens 59. This could be accomplished by a mechanism such as shown in Figs. 1 and 2.

While in some instances it may not be possible for the ridges of the grooved mirror 36 or the grooved lens 57 to be perfectly straight and parallel, yet their form should be such that their images formed on the film in the camera are straight and parallel.

The image formed on the ribbed mirror is inverted. If it were photographed by a motion picture camera in the ordinary way and projected, it would be inverted on the screen. This can be avoided in any of several obvious ways, the camera might be inverted, the film operating mechanism might be inverted within the camera, or an inverted prism might be attached to the camera or the projector.

I claim:

1. In an apparatus for the production of stereoscopic pictures, the combination of means for reproducing an image, a ridged element for diverting light rays to said means, and focusing means associated with the ridged element.

2. In an apparatus for the production of stereoscopic pictures, the combination of a camera adapted to contain a sensitized surface, and a ribbed element for diverting rays of light to said camera.

3. In an apparatus for the production of stereoscopic pictures, the combination of means for reproducing an image, a ridged element for diverting rays of light to said means and light focusing means therefor.

4. In an apparatus for the production of stereoscopic pictures, the combination of a camera adapted to contain a sensitized surface, a ribbed element for changing the direction of rays of light to the camera, and light focusing means for diverting rays of light to the ribbed element.

5. In an apparatus for the production of stereoscopic pictures, the combination of a camera adapted to contain a sensitized surface, a ribbed element for changing the direction of light rays to the camera, and one or more concave mirrors for focusing light on the ribbed element.

6. In an apparatus for the production of stereoscopic pictures, the combination of a camera adapted to contain a sensitized surface, a ribbed mirror, and light focusing means.

7. In an apparatus for the production of stereoscopic pictures, the combination of a camera adapted to contain a sensitized surface, a ribbed mirror for diverting light rays to the camera, and light focusing means for the ribbed mirror.

8. In an apparatus for the production of stereoscopic pictures, the combination of a camera adapted to contain a sensitized surface, a ribbed mirror for diverting light rays to the camera, and one or more concave mirrors for focusing light on the ribbed mirror.

9. In an apparatus for the production of stereoscopic pictures, the combination of a camera adapted to contain a sensitized surface, a fixed ribbed mirror for diverting light rays to the sensitized surface, and one or more concave mirrors for focusing light on the ribbed mirror.

10. In an apparatus for the production of stereoscopic pictures, the combination of means for reproducing an image, a ribbed lens, and light focusing means.

11. In an apparatus for the production of stereoscopic pictures, the combination of a camera adapted to contain a sensitized surface, a ribbed lens for diverting light rays to the camera, and light focusing means for the ribbed lens.

12. In an apparatus for the production of stereoscopic pictures, the combination of a camera adapted to contain a sensitized surface, a ribbed lens for diverting light rays to the camera, and one or more concave mirrors for focusing light on the ribbed lens.

13. In an apparatus for the production of stereoscopic pictures, the combination of means for reproducing an image, a fixed mirror for diverting light rays thereto, and one or more concave mirrors for focusing light rays on the fixed mirror.

14. In an apparatus for the production of stereoscopic pictures, the combination of a camera, a supporting frame therefor, a mirror fixed to said frame, light focusing means for the mirror, and means for causing relative adjustment between the frame and the focusing means.

15. In an apparatus for the production of stereoscopic pictures, the combination of a camera, a supporting frame therefor, a light diverting element fixed to the frame, one or more concave mirrors, and means for adjusting the frame relative to the concave mirrors.

16. In an apparatus for the production of stereoscopic pictures, the combination of a frame, a camera fixed thereto, a ribbed light diverting element fixed to this frame, and a plurality of concave mirrors for focusing light on the ribbed element.

17. In an apparatus for the production of stereoscopic pictures, the combination of a frame, a camera fixed thereto, a ribbed light diverting element fixed to this frame, a plurality of concave mirrors for focusing light on the ribbed element, cases for the concave mirrors, pivotal means for supporting the cases, and means for causing relative adjustment between the concave mirrors and the frame.

18. In an apparatus for the production of stereoscopic pictures, the combination of light focusing means, a ribbed element having an assemblage of a substantial number of relatively small elements distributed throughout the image formed by said means, each of said elements being adapted to separate the light forming the part of the image that is coincident with it into the rays which come from different parts of said light focusing means, which rays correspond to different aspects of the object photographed, and means for obtaining a photographic record of the composite image so obtained.

19. In an apparatus for the production of stereoscopic pictures, the combination of a camera adapted to contain a sensitized surface and a lined screen, and one or more concave mirrors for focusing light on the lined screen, and fixed relative thereto.

20. In an apparatus for the production of stereoscopic pictures, the combination of means for reproducing an image, and a concave spherical light focusing mirror for the image reproducing means.

21. In an apparatus for the production of stereoscopic pictures, the combination of means for reproducing an image, and a plurality of concave spherical mirrors for focusing light-rays on said means.

22. In an apparatus for the production of stereoscopic pictures, the combination of a stereoscopic picture camera having a sensitized surface and a lined screen, and one or more concave spherical mirrors for focusing light on the lined screen.

In testimony whereof I affix my signature.

CLARENCE W. KANOLT.